US008047424B2

(12) United States Patent
Hoffman

(10) Patent No.: US 8,047,424 B2
(45) Date of Patent: Nov. 1, 2011

(54) METHOD FOR MANAGING INTELLIGENT MAIL TRACKING CODES FOR MULTIPLE MAILERS

(75) Inventor: Niel Hoffman, Naperville, IL (US)

(73) Assignee: Pitney Bowes Inc., Stamford, CT (US)

( * ) Notice: Subject to any disclaimer, the term of this patent is extended or adjusted under 35 U.S.C. 154(b) by 408 days.

(21) Appl. No.: 12/331,080

(22) Filed: Dec. 9, 2008

(65) Prior Publication Data

US 2010/0140340 A1 Jun. 10, 2010

(51) Int. Cl.
*G06F 17/00* (2006.01)

(52) U.S. Cl. ........................................ 235/375; 235/487

(58) Field of Classification Search .................. 235/375, 235/487; 705/404, 406, 407, 408
See application file for complete search history.

(56) References Cited

U.S. PATENT DOCUMENTS

2003/0101148 A1* 5/2003 Montgomery et al. ........ 705/404
2005/0197874 A1* 9/2005 Lehman ............................ 705/7
2009/0164662 A1* 6/2009 Mather ......................... 709/243

OTHER PUBLICATIONS

United States Postal Service®—Intelligent Mail Planning & Standards,"One Code Solution™—Intelligent Mail® Barcode Technical Resources Guide", Rev. 2.8, 2007, pp. 1-13.
United States Postal Service®, "Confirming Service Featuring OneCode Confirm", Pub. 197, pp. 1-122, Mar. 2008.

* cited by examiner

*Primary Examiner* — Edwyn Labaze
(74) *Attorney, Agent, or Firm* — Michael J. Cummings; Charles R. Malandra, Jr.; Steven J. Shapiro

(57) ABSTRACT

A computer implemented method for a mail tracking service provider to manage mail tracking identification codes for customers. A master list is maintained of identification codes that have been provided to customers. A customer sends a request for a block of identification codes to use with their mailing. The service generates a block of identification codes, referring to the master list to determine identification codes that are not already being used. The generated block is sent to the customer. The service updates the master list to identify the customer and the block sent. The mailer sends mailing job data back to the tracking service. The job data identifies which codes from the block have been placed on mail to be delivered. The service gathers data about the delivery of the mail from the carrier service, and the tracking data is consolidated and provided in a report to the customer.

10 Claims, 4 Drawing Sheets

METHOD FOR MANAGING INTELLIGENT MAIL TRACKING CODES FOR MULTIPLE MAILERS

BACKGROUND OF THE INVENTION

Individuals and companies that send mail are often interested in tracking delivery of mail as it passes through the delivery system. In addition to providing assurance that mail is reaching its destination, tracking is useful for determining whether the timing of the mail is meeting the sender's business needs. For example, someone sending a bill may want the mail to be delivered in time for the recipient to receive it and pay before the due date. Marketing messages may be timed to coincide with a sale or a special event.

Delivery services, like the United States Postal Service (USPS), offer tracking services to meet these interests in tracking. Typically, a special barcode is placed on the mail item. As the mail is transported through the delivery system, barcode scanners are used to scan the codes on the mail and identify each individual piece and its location within the USPS processing facilities. Data related to the processing and delivery of the mail pieces can then be sent back to an originator associated with a particular code.

Use of USPS mail tracking services requires that an account with the USPS be arranged in advance, and a mailer must subscribe to the tracking service. Tracking codes and mailer identification codes are assigned to subscribers, and subscribers are required to inform the USPS when mail to be tracked is being inducted into the delivery system.

Rather than dealing directly with the USPS, some mailers find it desirable to obtain tracking capabilities through a third party tracking service, such as those provided at the website www.trackmymail.com. The tracking service takes responsibility for interacting with the USPS in fulfilling the requirements to assign tracking numbers to mail pieces and to initiate tracking for particular mail pieces. Also, such third party services will process the raw, and difficult to interpret, USPS tracking data, and prepare a report for mailers that is more user friendly. Third party services achieve economies of scale by handling tracking codes for many different customers. Such services may be particularly attractive to mailers who only have an occasional need for tracking their mail, and who can benefit from the tracking services' quick access to tracking capabilities.

SUMMARY OF THE INVENTION

The invention includes a computer implemented method for a mail tracking service to manage mail tracking identification codes for customers. The service maintains a master list of identification codes that have been provided to customers. A customer sends a request for a block of identification codes to use with their mailing. In response, the service generates a block of identification codes, referring to the master list, to determine identification codes that are not already being used. The selected block is sent back to the customer's computer. The service updates the master list to identify the customer and the corresponding block of identification codes that was sent. After preparing its mailing with the codes, the mailer sends mailing job data back to the tracking service. The job data identifies which codes from the block have been placed on mail to be delivered. The mail tracking service gathers data about the delivery of the mail from the carrier service. The tracking data is consolidated and provided in a report to the customer. In a preferred embodiment, the customer is billed only for the portion of the block of identification codes that is used by the mailer.

In a further embodiment, the tracking service verifies that the mailing job data received from the customer does not include identification codes that are identical to codes that were used within a previous predetermined time. Such reuse of codes might result in less accurate tracking data and in postal penalties. The tracking service may also provide a service of counting a quantity of identification codes used by the customer and sending a low balance alert to the customer when a quantity of unused identification codes becomes less than a predetermined amount. The tracking service can also track the customer's usage patterns to determine an appropriate sized block of codes to provide in response to future requests.

In a further embodiment the identification codes may include both a mailer identifier field and a serial number field. The mailer identifier field identifies an entity that will be used for purposes of mail tracking, and the serial number field identifying a specific mail piece. When the customer provides the mailing job data to the tracking service the request may include a user mailer identifier number different than a default mailer identifier number. With such a customer selected mailer identifier, the tracking service's ability to check for duplicate or reused codes is particularly valuable, since the makeup of the overall code is taken out of the control of the tracking service. The check of the customers mail job data can also be used to check on the customer's compliance with the postal carrier's mail tracking requirements. A report can be provided to the customer indicating whether the use of the tracking numbers is in compliance.

DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION

Figure 1:
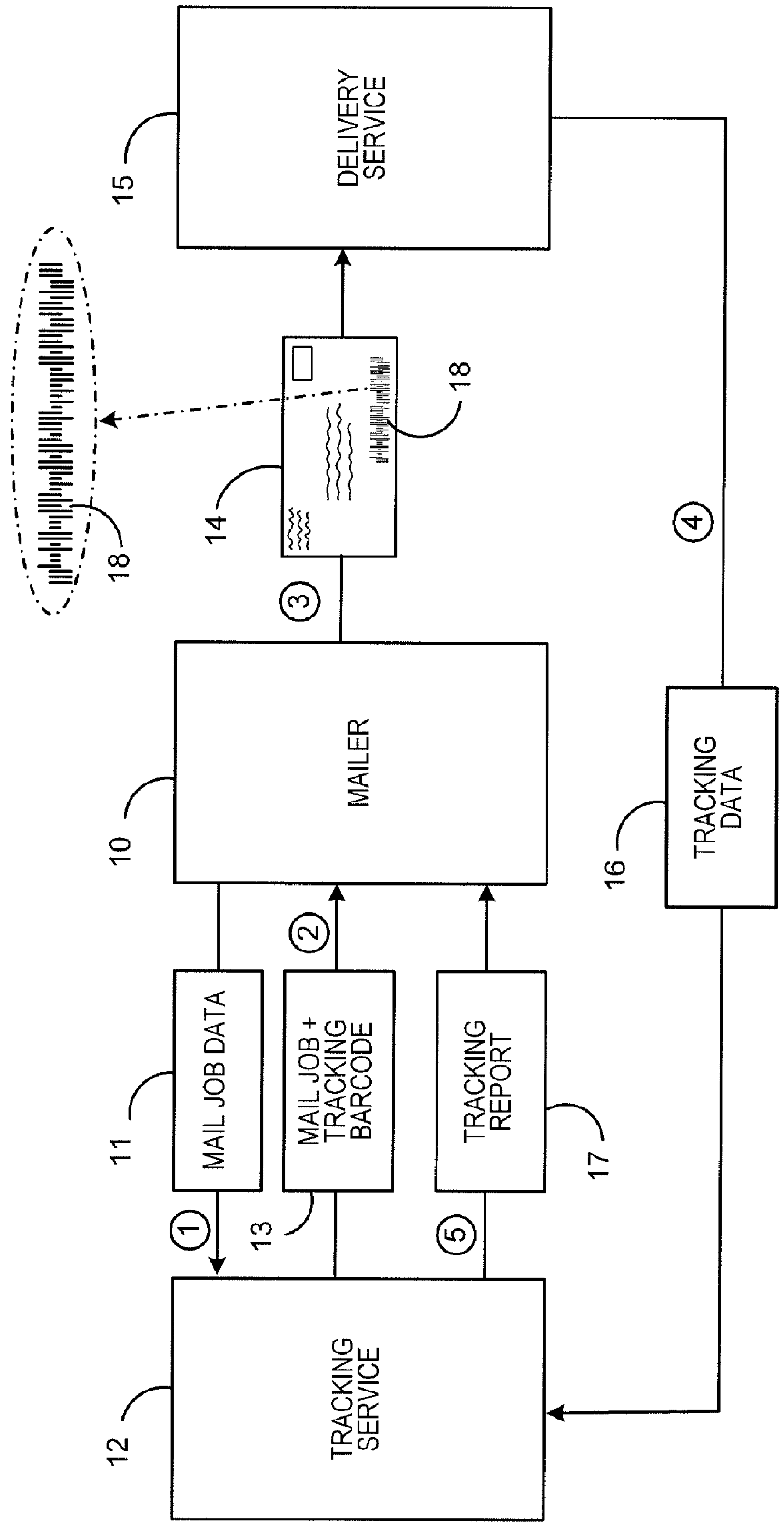
FIG. 1 (PRIOR ART)
FIG. 1 shows the operation of a prior art mail tracking service.

FIG. 1 depicts a prior art process used for providing mail tracking services. In this system, the mailer 10 determines that it wants to track the mail for a particular mail job. The mail job data 11 is sent to the tracking service 12 so that the appropriate tracking code and barcode can be prepared. The mail job data 11 describes the various mail pieces that will comprise the mail to be tracked. The tracking service 12 assigns a tracking code for each of the mail pieces in the mail job. In addition, the tracking code is encoded to a particular barcode format that is used for tracking. Such barcode formats may be PLANET code or an Intelligent Mail barcode, that are both commonly known and used by the USPS. The mail job data and the corresponding encoded barcodes 13 are then transferred back to the mailer 10 from the tracking service 12. In this type of prior art service, the tracking service 12 typically charges the mailer 10 based on the quantity of tracking codes requested to fill the need for all the mail in the mail job.

The mailer 10 then prints out the tracking barcodes 18 on the mail pieces 14. In this example, tracking barcode 18 is an Intelligent Mail barcode. The intelligent mail barcode 18 includes several different data fields. Those data fields include a "mailer identifier number" and a "serial number." The "mailer identifier" is a unique number that identifies the entity that the USPS will send the tracking information to. When the third party tracking service 12 is being used, the mailer identifier field is most likely to be the number for the service 12, who will receive and process the tracking data on behalf of the mailer 10. The "serial number" field typically includes a unique number identifying the specific mail piece. The tracking service 12 has associated serial numbers with each of the mail items being tracked.

The printed envelope 14 is provided to the deliver service 15 (in the preferred embodiment, the USPS) for delivery. During the course of delivery processing the tracking barcode 18 is scanned by the USPS sortation and delivery equipment. The delivery service 15 gathers information about the scanned codes, the time and location of the scanning, the type of processing, and sends (or otherwise makes available) the gathered tracking data 16 to the tracking service 12. The delivery service 15 determines the appropriate recipient for the tracking data based on the "mailer identifier" portion of the tracking barcode 18. Finally, the tracking service 12 processes the raw tracking data 16 into a tracking report 17 that is provided to the mailer 10.

Figure 2:
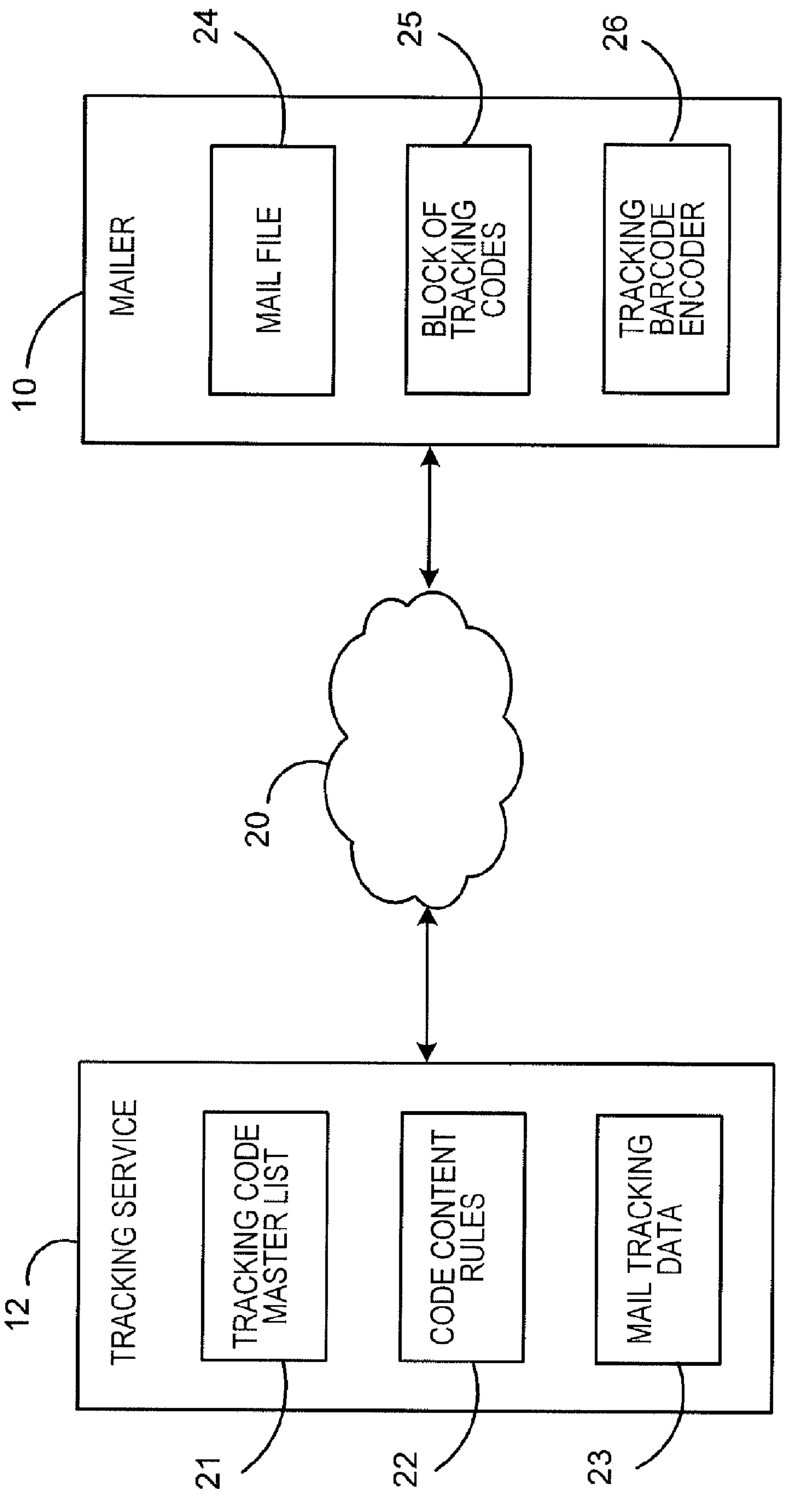
FIG. 2 shows a preferred embodiment of components at the tracking service and at the customer for implementing the invention.

FIG. 2 depicts the basic components resident on the respective computer systems of the tracking service 27 and the mailer 28 in accordance with the preferred embodiment. The tracking service keeps a master list 21 of tracking codes. The master list 21 includes unused codes that are available to be provided to mailers. The master list 21 also associates ranges of used codes with the corresponding mailer to whom the codes were provided. The master list 21 further indicates which of the codes that have been provided to mailers have been used on mail.

A further significant component of the tracking service 27 are the code content rules 22 stored on the services computers. The USPS requires a particular arrangement of fields within the tracking codes in order for tracking services to be provided. The USPS also requires that tracking codes not be reused within a predetermined period of time (for example: 45 days). Accordingly, when the mailer 28 provides information about the mail and the corresponding tracking codes that it intends to use, the tracking service 27 can confirm that the tracking codes to be used comply with the USPS requirement. This capability is particularly relevant using the preferred embodiment whereby the mailer 28 associates the particular tracking codes to mail pieces. In the prior art, tracking codes were assigned to particular mail items by the service provider. Thus, it is important to have the capability to detect mistakes made by the mailer 28 under the new arrangement.

The tracking service 27 further stores the mail tracking data 23 received from the USPS (or other delivery service). Tracking data 23 is provided to the tracking service 27 because the tracking code identifies the tracking service 27 as the appropriate party to whom the information should be sent. The tracking service 27 can then use the specific identification code to determine which of its customers the mail piece was sent by, and to compile and direct the results accordingly. Typically the tracking service 27 and the mailer 28 exchange data over a network 20, such as the Internet.

The components of the tracking service 27 may be stored and executed on a server computer configured with network and Internet communication, and modified to include the software to perform the steps and components described herein. Alternatively, the steps and components may be resident under more than one computer that are networked under the control of the tracking service 27.

The mailer 28 also includes some basic components for utilizing the preferred embodiment. The mailer has a mail file 24 that describes the mail job that is going to be tracked. The mail file 24 will typically identify individual mail pieces and characteristics of those mail pieces, such as the intended recipient and address. By linking the tracking barcodes to the mail file 24, the mailer 28 is able to track delivery of individual pieces.

The mailer 28 also maintains a block of tracking codes 25 that have been received from the tracking service 27. As a mailing job is developed, unused tracking codes from the block of tracking codes 25 are associated with individual mail pieces in the mail file 24. A tracking barcode encoder 26 is resident at the mailer 28 to convert the numerical identification numbers of the block of codes 25 into a graphical barcode that can be printed on the mail pieces. Since printing of mail pieces is likely to occur at the mailer 28, it is advantageous to perform the encoding of the barcodes locally with the encoder 26, and it is possible to avoid transmitting data intensive graphical information over the network 20, between the mailer 28 and the tracking service 27. The functionality of mailer 28 is preferably resident on a personal computer configured for Internet communication and modified to include the mail file 24, the block of tracking codes 25, and the barcode encoder 26, along with other software components as may be described in this application.

Figure 3:
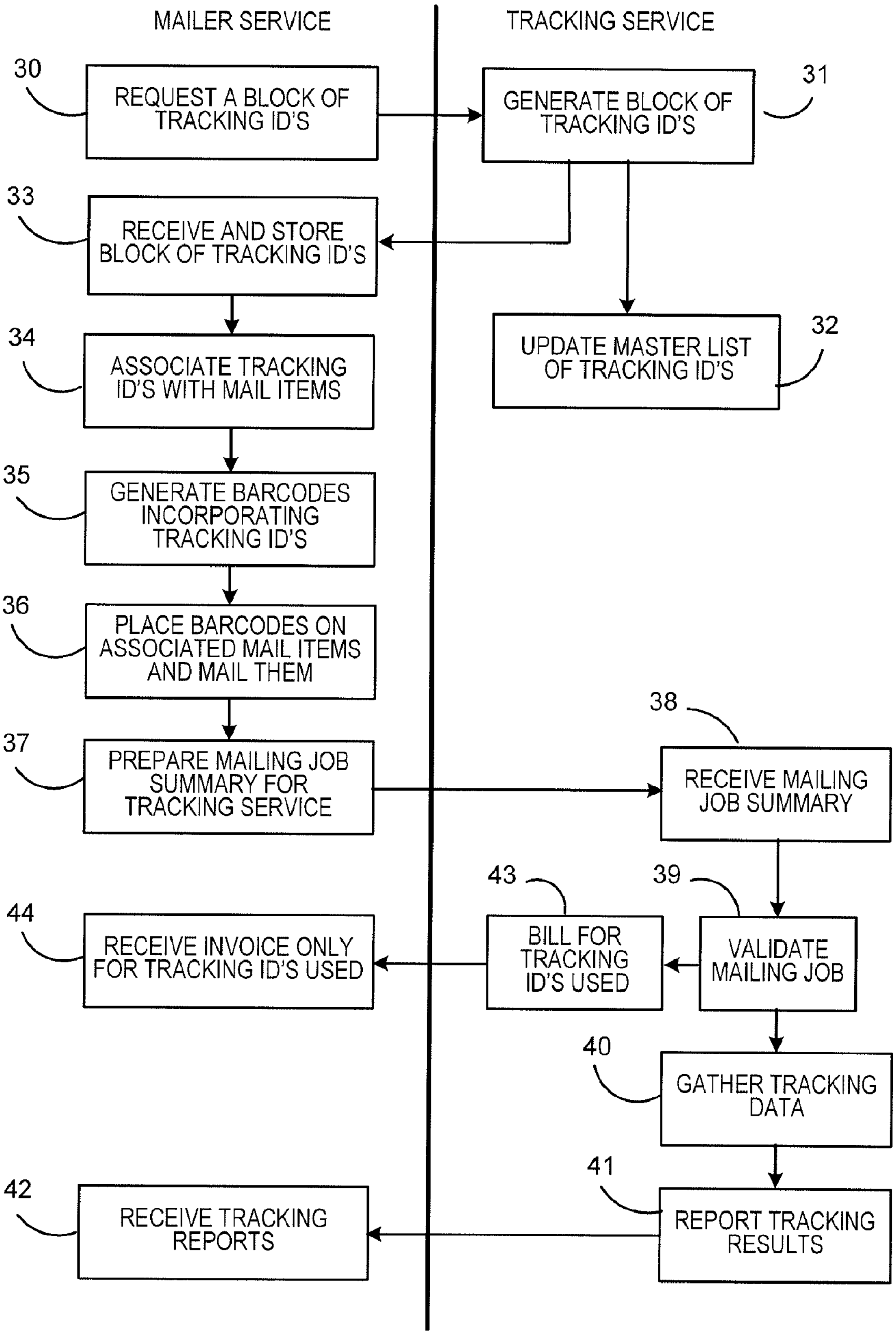
FIG. 3 shows steps occurring at the mailer and at the tracking service for implementing a preferred embodiment.

FIG. 3 depicts a preferred embodiment of the steps carried out by the tracking service and the mailer to manage mail tracking data. When the mailer decides that they wish for a mail job to be tracked, the mailer requests a block of tracking ID's from the tracking service (step 30). This request is typically sent over the Internet from the mailer's computer via a web browser. The quantity of tracking ID's that the tracking service is willing to provide might be limited. In this preferred embodiment, the mailer is not charged for the tracking ID's until they are used. Therefore, there is no incentive to be conservative on how may ID's to request. Since the tracking service does only maintain a finite number of tracking ID's available at any particular time, it may be necessary to limit the maximum number of ID's that can be requested at a time. The tracking service may choose to limit the number of ID's based on the mailer's ID usage over a previous period of time. For example, a mailer may be limited to a quantity that is approximately the number of ID's that were used over the past six months. The functionality for limiting the quantity of ID's that can be provided may be at the mailer or at the tracking service.

At step 31, the tracking service creates the block of tracking ID's for the mailer. The block is selected from a larger set of tracking ID's that the tracking service has reserved from the USPS (or other delivery service). Blocks of ID's are typically consecutive numbers, but not necessarily so. The tracking services master list of tracking ID's is updated to identify which numbers have been provided to which mailers (step 32). The mailer receives and stores the block of tracking ID's provided (step 33), and in the preferred embodiment the mailer will not be charged until they are used.

At step 34, the mailer associates tracking ID's from the stored block with particular mail items that are part of a mailing job. Thus, a mail job data file will be typically be updated to indicate particular ID's that are associated with particular pieces. Using barcode encoding software, a graphical barcode will be generated based on the tracking ID's that are being associated with mail pieces (step 35). The preferred barcode format is the Intelligent Mail Barcode developed by the USPS and known in the art to include enough digits and information to uniquely track mail pieces in the U.S. postal system. At step 36, the generated barcodes with the tracking ID's are placed on the mail pieces. Typically, the barcodes will be printed on envelopes, or printed on labels that can be placed on the mail items.

At step 37, the mailer further prepares a mailing job summary for the tracking service. The step of providing the summary may be done before, after, or concurrently with the step 36 of placing the barcode on the mail piece. An advantage of doing the job summary before, is that the tracking service may have an opportunity to identify any errors in connection with the tracking service before the expense of printing is incurred. At step 38, the tracking service receives the mailing job summary. The tracking service checks the tracking ID's proposed for use in the mailing job summary to make sure that they are in compliance with postal tracking requirements (for example, that they are not being reused within a certain amount of time, or that there are not duplicates). When the tracking service sees the quantity of tracking ID's that are being used by the mailer, that is the preferred time to bill the mailer for the quantity used (step 43). Mailers can better manage costs of tracking ID's by only being invoiced for tracking ID's as they are used (step 44). After receiving and validating the mailing job summary, the tracking service updates the master list of tracking ID's to indicate which of the ID's issued to the mailer have been put into use.

As the mail is processed by the delivery service, the barcodes on the mail pieces are scanned. Tracking data relating to the identification codes is transmitted from the delivery service to the tracking service (step 40). As discussed above, the tracking numbers include a "mailer identification" portion that indicates the party to whom tracking data should be sent. In the preferred embodiment, the "mailer identification" field of the code identifies the mail tracking service. However, the validation steps 39 may also be performed on identification codes that are being used by the mailer that are not using the mail tracking service for collecting tracking data. For example, a mailer may have some ID codes that it has received itself directly from the USPS, and it wishes to incorporate those codes in the mailing. In that case, the mail tracking service can test whether the codes appear to meet postal requirements, but the delivery tracking data will not be available to the mail tracking service, and no tracking will be done for those mail pieces where the mailer identification field on the ID is not the tracking service's default ID.

Figure 4:
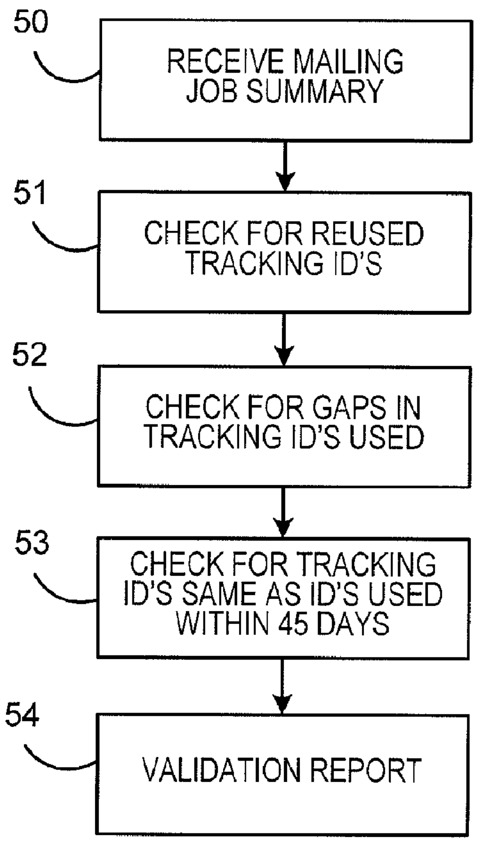
FIGS. 4 and 5 show steps for processing mailing job data at the mail tracking service.

FIG. 4 shows some of the validation steps that the mail tracking service can provide. Upon receiving the mailing job summary (step 50), the mail tracking service can check to see whether ID's are being reused. Reuse may be improper if the same number is being used within the same mailing. Reuse may also be improper if the same number is being reused within a certain amount of time since it was used for another mail piece (45 days for USPS) (step 53). The service can also check to see if there are gaps in the tracking ID's that are being used for the job (step 52). Such a gap might indicate a problem with the data. The service can provide a report back to the mailer identifying any errors, or irregularities that may be of interest.

Figure 5:
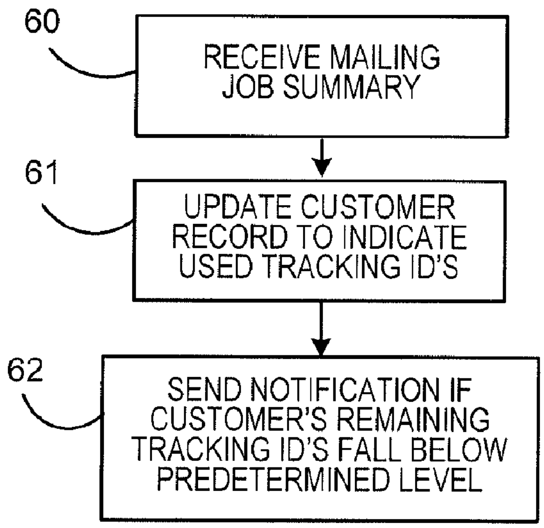

FIG. 5 depicts another automated feature of the mail tracking service. Upon receiving the mailing job summary (step 60), the service updates its master list to indicate which of the mailer's block of ID's have been used (step 61). If it is seen that the number of unused ID's in the mailer's outstanding block falls below a threshold level, then the service can send an automated reminder instructing the mailer that they may wish to order another block of ID's. Alternatively, the service could be set up to automatically replenish the mailer with a new block of ID's when the quantity gets too low.

While the present invention has been described in connection with what is presently considered to be the most practical and preferred embodiments, it is to be understood that the invention is not limited to the disclosed embodiment, but, on the contrary, is intended to cover various modifications and equivalent arrangements included within the spirit and scope of the appended claims.

What is claimed is:

1. A computer implemented method for utilizing mail tracking identification codes to facilitate automated mail tracking services, the method comprising:

submitting a request to a remote server for a block of mail tracking identification codes;

receiving and storing the block of mail tracking identification codes sent in response to the request;

associating individual mail tracking identification codes from the block with individual mail items in a user's mail file;

updating a record to indicate a remaining unused portion of the stored block of mail tracking identification codes;

encoding mail tracking barcodes based on the individual mail tracking identification codes associated with the individual mail items;

updating the user's mail file to indicate mail tracking identification codes for the individual mail items;

applying the encoded mail tracking barcodes on corresponding individual mail items;

uploading information from the user's mail file to the remote server indicating identification codes applied to mail items for tracking; and receiving mail tracking data from the remote server for mail items with the mail tracking barcodes.

2. The method of claim 1 wherein the mail tracking identification codes include both a mailer identifier field and a serial number field, the mailer identifier field identifying an entity that will be used for purposes of mail tracking, and the serial number field identifying a specific mail piece, and the step of encoding further includes selecting a mailer identifier code to be included in the mailer identifier field.

3. A computer implemented method for managing mail tracking identification codes for a plurality of mailing customers receiving automated mail tracking services, the method comprising:

maintaining a master list, at a service computer, of identification codes that have been provided to customers;

receiving a request at the service computer from a customer's computer over a network for a block of identification codes;

generating a block of identification codes at the service computer, the step of generating including referring to the master list to determine identification codes that are not being used by other customers;

transmitting the block of identification codes from the service computer to the customer's computer;

updating the master list to identify the customer and the corresponding block of identification codes;

receiving and storing the block of identification codes at the customer's computer;

associating individual identification codes from the block with individual mail items in a user's mail file at the user's computer;

updating a record at the user's computer to indicate a remaining unused portion of the stored block identification codes;

encoding mail tracking barcodes at the user's computer based on the individual identification codes associated with the individual mail items;

updating the user's mail file at the user's computer to indicate individual identification codes for the individual mail items;

applying the encoded mail tracking barcodes to corresponding individual mail items;

uploading information from the user's mail file at the user's computer to the service computer, the information indicating identification codes applied to mail items for tracking; and providing mail tracking data, from the service computer to the customer's computer, for mail using the identification codes in the applied tracking barcodes.

4. The method of claim 3 further including a step of billing the customer for a quantity of identification codes used from the block of identification codes provided.

5. The method of claim 3 further including a step of verifying at the service computer that the identification codes used for the individual mail items, as identified in the user's mail file, do not include identification codes that are identical to codes that were used within a previous predetermined time.

6. The method of claim 3 further wherein the step of generating the block of identification codes includes generating a quantity of new identification codes based on past usage patterns of the customer.

7. The method of claim 3 wherein the identification codes include both a mailer identifier field and a serial number field, the mailer identifier field identifying an entity that will be used for purposes of mail tracking, and the serial number field identifying a specific mail piece, and wherein the step of receiving mailing job data further includes receiving a request to include a user mailer identifier number different than a default mailer identifier number.

8. The method of claim 7 further including a step of verifying, at the service computer, that the mailing job data received from the customer, with the requested user mailer identifier number does not include identification codes that are identical to codes that were used within a predetermined time.

9. The method of claim 7 wherein the step of providing mail tracking data to the customer does not include providing tracking data for mail using the user mailer identifier number.

10. The method of claim 3 further including a step of validating that the mailing job data received from the customer complies with mail tracking requirements.

* * * * *